United States Patent [19]

Yamada

[11] Patent Number: 4,558,442
[45] Date of Patent: Dec. 10, 1985

[54] DETECTOR CIRCUIT FOR CAPACITANCE DISC RECORDS

[75] Inventor: Kazuo Yamada, Noda, Japan

[73] Assignee: Victor Company of Japan, Limited, Yokohama, Japan

[21] Appl. No.: 466,391

[22] Filed: Feb. 14, 1983

[30] Foreign Application Priority Data

Feb. 15, 1982 [JP] Japan ................................. 57-22392
Feb. 15, 1982 [JP] Japan ................................. 57-22393

[51] Int. Cl.⁴ ............................................. G11B 9/06
[52] U.S. Cl. ................................... 369/126; 369/129
[58] Field of Search ............................... 369/126, 129

[56] References Cited

U.S. PATENT DOCUMENTS

| | | | |
|---|---|---|---|
| 2,548,211 | 4/1951 | Frantz ................................ | 369/129 |
| 3,872,240 | 3/1975 | Carlson et al. ...................... | 369/126 |
| 4,080,625 | 3/1978 | Kamamoto et al. ................. | 369/126 |
| 4,459,691 | 7/1984 | Yamada ............................... | 369/126 |

Primary Examiner—Raymond F. Cardillo, Jr.
Assistant Examiner—Steven R. Garland
Attorney, Agent, or Firm—Pollock, Vande Sande & Priddy

[57] ABSTRACT

A capacitance detector for detecting the information recorded in the form of a series of microscopic pits on a capacitance disc record. The detector comprises, within an outer conductor, a dielectric support, an oscillator having a first line conductor on the support for generating microwave energy, a coaxial resonator having a second line conductor on the dielectric support, the second line conductor being coupled to the electrode of a capacitance detection stylus. Means are provided for inductively coupling the microwave energy from the oscillator to the resonator. This coupling means comprises a loop having a first section inductively coupled with said first line conductor and a second section inductively coupled with said second line conductor, and a capacitor connected from an intermediate point between the first and second sections to ground, so that the microwave energy coupled to the second line conductor is modulated in amplitude with capacitance variations corresponding to the microscopic pits. An amplitude demodulator is provided for demodulating the amplitude-modulated energy to derive a signal representing the capacitance variation on the record.

8 Claims, 3 Drawing Figures

DETECTOR CIRCUIT FOR CAPACITANCE DISC RECORDS

BACKGROUND OF THE INVENTION

The present invention relates generally to playback circuits for capacitance disc records.

It is known in the art that the reproduction of capacitance disc records involves the use of a stylus formed of a diamond with an electrode attached thereto to form a variable capacitance between it and the conductive layer of a capacitance disc record on which information is recorded in the form of a series of microscopic pits. This geometric variation is detected as a variation in capacitance. In current practice, the capacitance between the stylus electrode and the record's conductive layer forms part of a coaxial resonator to which microwave energy is coupled by a coupling circuit from a 1-GHz oscillator. The coaxial resonator acts as an amplitude modulator, so that the microwave energy is modulated in amplitude with the capacitance variation on the disc record. The output of the coaxial resonator is applied to an amplitude demodulator to detect a signal representing the capacitance variation.

A typical example of prior art capacitance detectors is shown specifically in FIG. 1, as comprising a metal casing 7 which is grounded and serves as an outer conductor, the casing being separated by a conductive partition 8 to define a first chamber for generation of the high frequency energy and a second chamber for amplitude modulation and demodulation. The oscillator 1 comprises a strip line conductor 10 which is formed in the first chamber on the surface of a dielectric support 9 and extends along one side of the metal casing 7. The conductor 10, which acts as an inner conductor of the oscillator, is capacitively coupled by a trimmer capacitor 11 to one end wall of the casing, the other end of the conductor 10 being capacitively coupled by a coupling capacitor 12 to a transistor 13 disposed near the opposite end wall of the casing 7, the transistor 13 being connected to a known bias supply circuit, not shown, mounted on the dielectric support 9. The trimmer capacitor is used to adjust the generated frequency to a predetermined value (1 GHz, for example). The microwave energy generated in the oscillator 1 is coupled by a coupling circuit 2 formed by a loop 20 to the second chamber. This coupling loop has a first elongated section extending from the oscillator-side of the partition 8 in parallel with the conductor 10 to establish an inductive coupling therewith and a second elongated section terminating at the other side of the partition, these elongated sections being coupled by an intermediate section extending through an opening provided in the partition 8. A coaxial resonator 3 and an amplitude demodulator 4 are located in the second chamber. The resonator 3 is formed by a strip line conductor 30 which is in parallel with the second elongated section of the loop so that the microwave energy is coupled from the oscillator 1 via the coupling circuit 2 to the resonator 3. One end of the conductor 30 is coupled through an opening in the casing 7 by a connecting wire 32 to the electrode of a capacitance detection stylus to supply it with microwave energy and the other end of which is coupled capacitively by means of a trimmer capacitor 31 to the casing 7. The microwave energy inductively coupled by loop 20 to the conductor 30 is amplitude modulated with the capacitance variation on the disc record. The amplitude-modulated energy is coupled by a coupling line conductor 5 to the amplitude demodulator 4 which is in the configuration of a peak detector formed by a diode 40 having its anode coupled to one end of the conductor 5 and its cathode coupled by a resistor 41 to the casing, the junction between diode 40 and resistor 41 being coupled to a feedthrough capacitor 42 having an output terminal 6.

The magnitude of the detected capacitance signal is proportional to the magnitude of the input microwave energy provided that the input frequency is kept precisely within a predetermined frequency range. To improve the signal-to-noise ratio at the output terminal 6, the amount of coupling between the oscillator 1 and resonator 3 could be increased to raise the input energy to the stylus. However, this results in a reduction in the carrier-to-noise ratio of the oscillator 1 due to the finite loaded Q-value of the oscillator and therefore no improvement is made in the signal-to-noise ratio. Additionally, the optimum value of the coupling is dependent on the manner of manufacture of the stylus electrode. For example, two types or styli are known in the art, one having an electrode formed by the deposition of hafnium or titanium and the other having an electrode formed by the transformation of the constituent carbon of the diamond into a conductive layer using an intense laser beam. Due to different tendencies to wear by contact with the record surface, these styli may differ in spacing between the lowermost end of the electrode and the stylus' contact face with the record surface and in the electrode's resistance. To overcome such shortcomings the prior art capacitance detector would involve time consuming work with which the spacing between the coupling loop 20 and its associated conductors is adjusted.

In addition, the conductor 5, the stray capacitances of the diode 40 and resistor 41, and the capacitor 42 constitute a resonant circuit having a resonant frequency higher than that of the resonator 3. This resonant circuit and the resonator 3 form a double-tuned circuit. Therefore, mutual interaction occurs between the resonator 3 and demodulator 4. However, due to manufacturing tolerances resulting in detector-to-detector variations in the capacitance values of diode 40 and capacitor 42, the resonant frequency of the amplitude demodulator 4 would vary in a wide range between different detectors, resulting in a wide range of detector output variations.

SUMMARY OF THE INVENTION

The primary object of the present invention is therefore to provide a capacitance detector circuit which is efficient to manufacture in the presence of circuit parameter variations due to manufacturing tolerances.

According to the invention, the capacitance detector is adapted to be coupled to the electrode of a stylus for detecting the information recorded in the form of a series of microscopic pits on a capacitance disc record. The capacitance detector comprises, within a housing which serves as an outer conductor, a dielectric support, an oscillator having a first line conductor on the support for generating microwave energy, a coaxial resonator having a second line conductor on the dielectric support, the second line conductor being coupled to the stylus electrode. Means are provided for inductively coupling the microwave energy from the oscillator to the coaxial resonator. This coupling means comprises a loop having a first section inductively coupled with said first line conductor and a second section inductively coupled with said second line conductor, and a capacitor connected from an intermediate point between the first and second sections to ground, so that the microwave energy coupled to the second line conductor is modulated in amplitude with capacitance variations which occur in correspondence with the microscopic pits. An amplitude demodulator is provided for demodulating the amplitude-modulated energy to derive a signal representing the capacitance variations.

Due to the provision of the capacitor in the coupling circuit, the latter forms a resonant circuit having a frequency predeterminable by appropriately proportioning the value of the capacitor. The impedance of the coupling means as viewed from the oscillator and hence the amount of coupling between the oscillator and the resonator is rendered variable as a function of the frequency of the coupling means. The capacitor detector of the invention can therefore be manufactured efficiently by forming the loop of the coupling circuit with the rest of the conductive patterns of the detector using conventional printing or vacuum deposition methods.

According to a further aspect of the invention, the amplitude demodulator comprises a peak detector having a diode which is directly coupled to the second conductor. This direct coupling prevents the parameter variations of the demodulator from adversely affecting the amplitude of the output signal of the capacitor detector.

BRIEF DESCRIPTION OF THE DRAWINGS

The present invention will be described in further detail with reference to the accompanying drawings, in which.

DETAILED DESCRIPTION OF THE INVENTION

Figure 1:
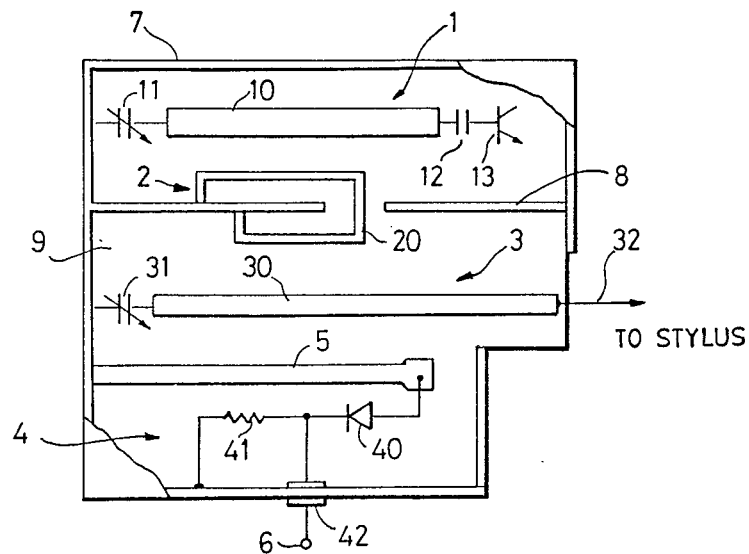
FIG. 1 is a plan view of an embodiment of a prior-art capacitance detector circuit with a top wall being removed to make the inside visible.
Figure 2:
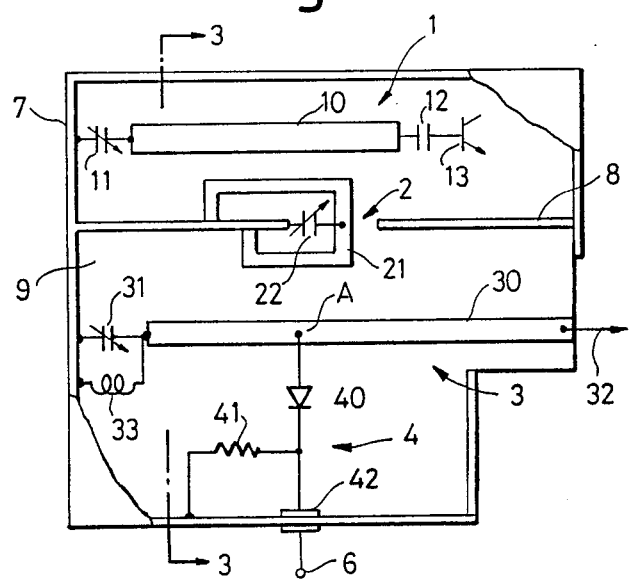
FIG. 2 is a plan view of an embodiment of the present invention.
Figure 3:
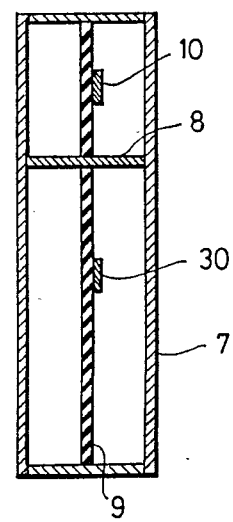
FIG. 3 is a cross-sectional view taken along the lines 3—3 of FIG. 2.

Referring now to FIGS. 2 and 3, there is shown a preferred embodiment of the invention in which parts corresponding to those in FIG. 1 are marked with the same numerals as in FIG. 1. This embodiment is generally similar to the prior art shown in FIG. 1, but differs in that it advantageously allows the use of a method as used in making printed-circuit boards to form a coupling loop 21 on the upper surface of the dielectric support 9 according to a predetermined pattern. The dielectric substrate 9 is spaced from the bottom and top walls of the casing as shown in FIG. 3. The use of such methods allows all the conductor patterns of the detector to be formed in a single deposition step. A capacitor 22 is coupled between an intermediate point of the loop 21 and the partition 8 to form a resonant circuit. By appropriately proportioning the value of capacitor 22 it is possible to alter the impedance of the coupling circuit 2 presented to the microwave energy to be transmitted. Therefore, the amount of coupling between oscillator 1 and resonator 3 can be adjusted to an appropriate value.

More specifically, if the capacitor 22 is selected so that the resonant frequency of the coupling circuit 2 is higher than either the resonant frequency of the oscillator 1 or that of the coaxial resonator 3, an increase in the value of capacitor 22 for making the resonant frequency of coupling circuit 2 approach those of the circuits 1 and 3 will cause the impedance viewed from the oscillator 1 toward the resonator 3 to decrease, increasing the amount of energy transmitted to the output terminal 6, and vice versa. The proportioning of the capacitor 22 may be effected by either choosing an appropriate one from among a plurality of capacitors of different values or by using a trimmer capacitor.

The invention further differs from the prior art in that the coupling conductor 5 of the prior art detector is eliminated. Instead of using a coupling line conductor, the inductive coupling between resonator 3 and amplitude demodulator 4 is made by direct connection of the diode 40 to the conductor 30 at a point A which is appropriately determined between its opposite ends so that the resonator 3 and demodulator 4 have a common resonant frequency. Therefore, the manufacturing tolerances resulting in circuit-parameter variations as noted above would cause a single variation in the common resonant frequency and the corresponding variation in the output signal can be minimized.

A coil 33 is coupled between the conductor 30 and the casing 7 to quench the spark current generated across the gap between the stylus electrode and a disc record and provide a return path for the demodulated signal.

While the oscillator 1 and resonator 3 are of half wavelength coaxial type, a quarter-wavelength type of coaxial resonator could equally be as well used. In this instance, the coil 33 can be dispensed with.

What is claimed is:

1. A capacitance detector adapted to be coupled to the electrode of a stylus for detecting information recorded in the form of a series of microscopic pits on a capacitance disc record, comprising within a housing which serves as an outer conductor:

a dielectric support;

an oscillator having a first line conductor on said support for generating microwave energy;

a coaxial resonator having a second line conductor on said support, said second line conductor being coupled to the stylus electrode;

means for inductively coupling the microwave energy from said oscillator to said coaxial resonator, the coupling means comprising a loop having a first section inductively coupled with said first line conductor and a second section inductively coupled with said second line conductor, and a capacitor connected from an intermediate point of the loop between said first and second sections to ground, so that the microwave energy coupled to said second line conductor is modulated in amplitude with capacitance variations which occur in correspondence with said microscopic pits; and an amplitude demodulator for demodulating said amplitude-modulated microwave energy to derive a signal representing the capacitance variations;

wherein said capacitor comprises a variable capacitance element.

2. A capacitance detector as claimed in claim 1, wherein said amplitude demodulator comprises a peak detector having a diode directly connected to said second conductor.

3. A capacitance detector as claimed in claim 1, wherein said oscillator and resonator are separated by a partition having an opening therein, and wherein the first section of said loop is on one side of said partition and the second section of said loop is on the other side of said partition, said intermediate point of the loop extending through said opening and said capacitor being coupled to said partition.

4. A capacitance detector as claimed in claim 1, wherein said first and second line conductors and said loop each comprise a conductive film.

5. A single tuned capacitance detector adapted to be coupled to an electrode of a stylus for detecting information recorded in the form of a series of microscopic pits on a capacitance disc record, comprising within a housing which serves as an outer conductor:
   a dielectric support;
   an oscillator having a first line conductor on said support for generating microwave energy;
   a coaxial resonator having a second line conductor on said support, said second line conductor being coupled to the stylus electrode;
   means for inductively coupling the microwave energy from said oscillator to said coaxial resonator, the coupling means comprising a loop of fixed form having a first section inductively coupled with said first line conductor, a second section inductively coupled with said second line conductor and an intermediate section therebetween, and a capacitor connected from a point on said intermediate section to ground, so that the microwave energy coupled to said second line conductor is modulated in amplitude with capacitance variations which occur in correspondence with said microscopic pits; and
   a peak detector having a diode directly connected to a point intermediate opposite ends of said second conductor for demodulating said amplitude-modulated microwave energy to derive a signal representing the capacitance variations,
   wherein said capacitor comprises a variable capacitance element.

6. A single tuned capacitance detector adapted to be coupled to an electrode of a stylus for detecting information recorded in the form of a series of microscopic pits on a capacitance disc record, comprising within a housing which serves as an outer conductor:
   a dielectric support;
   an oscillator having a first line conductor on said support for generating microwave energy;
   a coaxial resonator having a second line conductor on said support, said second line conductor being coupled to the stylus electrode;
   means for inductively coupling the microwave energy from said oscillator to said coaxial resonator, the coupling means comprising a loop of fixed form having a first section inductively coupled with said first line conductor, a second section inductively coupled with said second line conductor and an intermediate section therebetween, and a capacitor connected from a point on said intermediate section to ground, so that the microwave energy coupled to said second line conductor is modulated in amplitude with capacitance variations which occur in correspondence with said microscopic pits; and
   a peak detector having a diode directly connected to a point intermediate opposite ends of said second conductor for demodulating said amplitude-modulated microwave energy to derive a signal representing the capacitance variations,
   wherein said capacitor comprises a variable capacitance element, and said oscillator and resonator are separated by a partition having an opening therein, wherein the first section of said loop is on one side of said partition and the second section of said loop is on the other side of said partition, said intermediate section of the loop extending through said opening and said variable capacitance element being coupled to said partition.

7. A single tuned capacitance detector adapted to be coupled to an electrode of a stylus for detecting information recorded in the form of a series of microscopic pits on a capacitance disc record, comprising within a housing which serves as an outer conductor:
   a dielectric support;
   an oscillator having a first conductive film securely deposited on said support for generating microwave energy;
   a coaxial resonator having a second conductive film securely deposited on said support, said second conductive film being coupled to the stylus electrode;
   means for inductively coupling the microwave energy from said oscillator to said coaxial resonator, the coupling means comprising a loop of fixed form having a first section inductively coupled with said first conductive film, a second section inductively coupled with said second conductive film and an intermediate section therebetween, and a capacitor connected from a point on said intermediate section to ground, so that the microwave energy coupled to said second conductive film is modulated in amplitude with capacitance variations which occur in correspondence with said microscopic pits; and
   a peak detector having a diode directly connected to a point intermediate opposite ends of said second conductive film for demodulating said amplitude-modulated microwave energy to derive a signal representing the capacitance variations.

8. A capacitance detector as claimed in claim 7, further comprising a partition having an opening therein for separating said oscillator and said resonator from each other, wherein the first section of said loop is on one side of said partition and the section of said loop is on the other side of said partition, said intermediate section of the loop extending through said opening, said capacitor being coupled to said partition.

* * * * *